United States Patent Office 3,090,631
Patented May 21, 1963

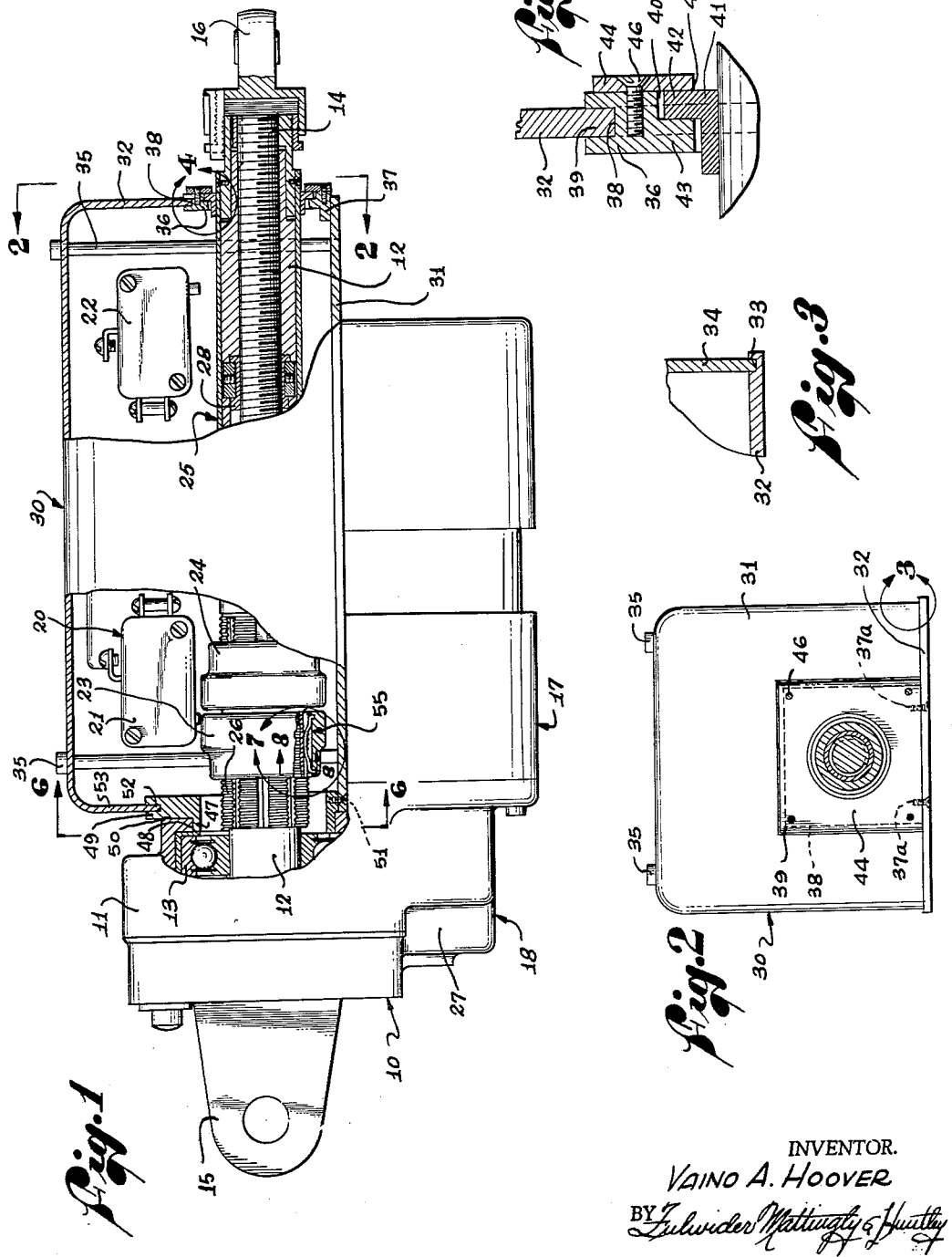

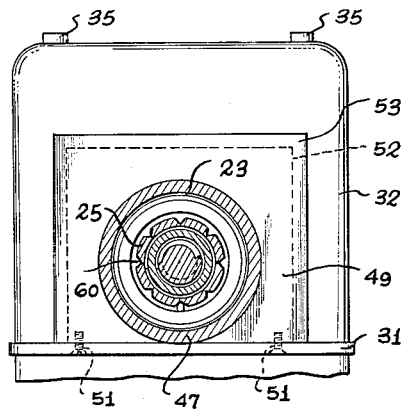
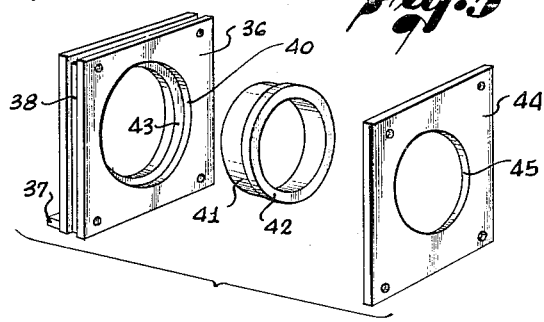
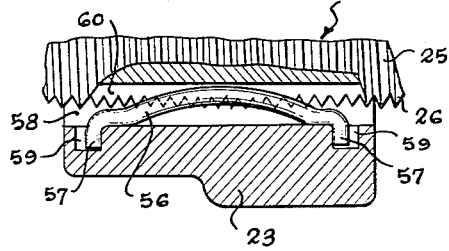
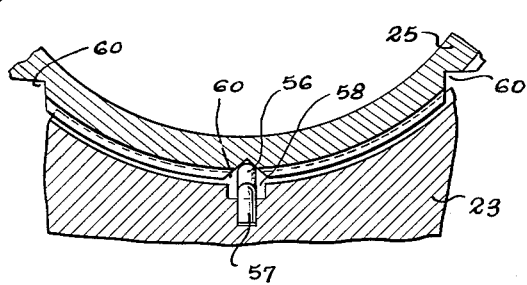

3,090,631
MECHANICAL ACTUATOR
Vaino A. Hoover, 2100 S. Stoner Ave., Los Angeles, Calif.
Filed Jan. 7, 1958, Ser. No. 707,626
2 Claims. (Cl. 277—174)

This invention relates generally to mechanical actuators, and more particularly to a mechanical actuator with positioning cams which are adjustable and enclosed in a sealed junction box.

The mechanical actuators referred to in this invention are of the same general type as those disclosed in my Patent No. 2,809,736, issued October 15, 1957, and entitled "Mechanical Actuator." These actuators find their principal application in aircraft where they are used to drive control surfaces, canopies, and other moving parts.

Actuators of the class described generally consist of a nut member mounted in a housing which is rotatable but axially immovable, and a screw member which is threadedly engaged with the nut member. The screw member is non-rotatable but axially movable with respect to the housing between extended and retracted positions by rotation of the nut member.

A drive motor and reduction gearing are provided to rotate the nut member and a limit switch or positioning mechanism is included which de-energizes the drive motor when the actuator reaches certain predetermined positions. The positioning mechanism generally includes cams which travel with the screw member and switches which are fixedly mounted on the housing to be engaged and actuated by the cams to thereby de-energize the motor.

In certain applications it is highly beneficial to have the positioning mechanism sealed so that dust and moisture cannot get into the electrical connections and switches. Since the screw member of the actuator travels axially with respect to the housing, any enclosure for sealing the positioning mechanism must be capable of permitting this axial movement. Also, since the screw member, when formed, may be slightly warped or may bow slightly under load, any seal formed between an enclosure for the positioning mechanism and the screw member must allow a certain amount of radial movement as well as axial movement.

It is also advantageous in certain applications to provide means for conveniently adjusting the positions at which the actuator's motor will be deenergized. Such adjustment means, to be effective, must be easily operable and readily accessible even though the positioning mechanism is disposed within a sealed enclosure. Actuators prior to my invention have not adequately provided these features.

It is therefore a major object of my invention to provide a mechanical actuator incorporating the above-mentioned advantageous features.

It is also an object of my invention to provide a mechanical actuator of the type described with its positioning mechanism in a sealed enclosure which permits axial movement and, to a limited degree, radial movement of the screw member without impairing the effectiveness of the seal.

It is another object of my invention to provide a mechanical actuator of the type described in which the cams that are carried by the screw member and determine the positions at which the actuator's drive motor is de-energized are adjustably mounted.

Still a further object of my invention is to provide a mechanical actuator of the type described above in which the adjustable cams are housed in a sealed enclosure which contains the positioning mechanism and a portion of the enclosure is removable to permit access to the cams for adjustment.

Yet another object of my invention is to provide a mechanical actuator as described above in which the adjustable cams have a self-locking mechanism which fixes them in the desired position of adjustment.

These and other objects and advantages of my invention will become apparent from the following detailed description of a preferred embodiment thereof, read together with the accompanying drawings, in which:

FIGURE 1 is a side elevational view of the actuator with portions broken away;

FIGURE 2 is a sectional view of the actuator taken on line 2—2 in FIGURE 1;

FIGURE 3 is an enlarged fragmentary sectional view taken at area 3 in FIGURE 2;

FIGURE 4 is an enlarged fragmentary sectional view taken at area 4 in FIGURE 1;

FIGURE 5 is an exploded perspective view of the sealing means shown in FIGURE 2;

FIGURE 6 is a sectional view taken on line 6—6 in FIGURE 1;

FIGURE 7 is an enlarged fragmentary sectional view taken at area 7 in FIGURE 1; and FIGURE 8 is an enlarged fragmentary sectional view taken on line 8—8 in FIGURE 1.

Referring now to the drawings, and particularly to FIGURE 1 thereof, the numeral 10 designates generally a mechanical actuator having a housing 11 in which an elongated nut or driving member 12 is rotatably mounted by bearings 13 (one of which is not shown). An elongated screw or driven member 14 is threadedly engaged with the nut member 12 so that when held against rotation, the screw member 14 travels axially upon rotation of nut member 12.

To connect the actuator 10 to a device to be driven thereby, a stationary ear 15 is formed on the housing 11 (left-hand end in FIGURE 1), and a movable ear 16 is attached to the outwardly extending end of screw member 14 (right-hand end in FIGURE 1). When the actuator has been connected to the driven device by means of the ears 15 and 16, screw member 14 cannot rotate and thus moves axially with respect to the housing 11 when nut 12 is rotated, thereby varying the spacing between the ears 15 and 16 and driving the driven device.

The nut member 12 is rotated by a reversible electric drive motor 17 which is mounted on the housing 11 and coupled to nut member 12 by reduction gearing 18.

The movement of the actuator 10 is controlled by a positioning mechanism 20 which includes two electric limit switches 21 and 22 . The switch 22 is connected in the circuit of motor 17 that controls its rotation in a direction which causes screw 14 to extend from housing 11, and is therefore referred to as the "extend" limit switch. Switch 21 is connected in the circuit of motor 17 that controls its rotation in the direction which causes screw 14 to retract, and is referred to as the "retract" limit switch.

To actuate the switches 21 and 22, the positioning mechanism 20 has two cams 23 and 24. The cams 23 and 24 are mounted on an elongated tube 25 which is attached by screws 25a to the outer end of the screw member 14, disposed in overlying concentric relationship thereto and prevents exposure of the screw member's threads when the screw member is extended. Threads 26 are formed on the periphery of tube 25 adjacent the end nearest housing 11 and the cams 23 and 24 are engaged with these threads and adjustable thereon, as will be explained later.

The cam 23 is positioned nearest housing 11 and is referred to as the "retract" limit cam since it is adapted to actuate retract limit switch 21. Cam 24 is adapted to actuate extend limit switch 22 and therefore is referred to as the "extend" limit cam.

When motor 17 is energized in the proper direction of rotation, the screw member 14 travels outwardly from housing 11 towards its extended position. Since tube 25 is attached to screw member 14, it moves outwardly also, carrying cams 23 and 24 with it. The extend limit switch 22 is mounted outwardly of housing 11 and positioned to be engaged and actuated by extend cam 24 when the screw member 14 nears the limits of its extension. Actuation of the extend swtich 22 de-energizes the motor and stops further extension of screw member 14, thereby establishing the screw member's extended position.

If motor 17 is then energized in the opposite direction, screw member 14 will travel inwardly toward housing 11 to its retract position. The tube 25 and therefore cams 23 and 24 will be carried along with the screw member. The retract limit switch 21 is mounted near the housing 11 and positioned to be engaged and actuated by the retract cam 23 when screw member 14 approaches the limits of its retract movement. When switch 21 is actuated, it de-energizes the motor 17 stopping further retraction of screw member 14 and establishing the screw member's retract position.

In certain applications, such as the actuation of aircraft wing flaps, it is highly desirable to have the retract position of the actuator very accurately determined. When my actuator 10 is to be used in such an application, I provide a load limiting mechanism 27 between drive motor 17 and the rotatable nut member 12. This load limiting mechanism 27 is of the same general type as disclosed in my Patent No. 2,809,736, issued October 15, 1957, and entitled "Mechanical Actuator," and comprises two drivingly engaged helical gears, one of which is axially movable against spring pressure when torque greater than a predetermined amount is transmitted. Means are provided by which this axial movement operates switches in the circuit of motor 17, thus de-energizing the motor when the actuator is subjected to an excessive torque.

When used in such applications, the actuator 10 is also equipped wtih anti-jam mechanical stops 28 at the limits of its extend and retract positions. These mechanical stops 28 are of the same general type as described in my Patent No. 2,590,251, issued March 25, 1952, and entitled "Mechanical Actuator," and comprise protruding jaws on both the nut and screw members which engage rotatably rather than axially and therefore do not wedge and jam.

The retract limit switch 21, in such applications, is connected in the circuitry of motor 17 as a shorting switch across the control switches of the load limiting mechanism 27. With this arrangement, the load limiting mechanism is prevented from operating during the major portion of the travel of screw member 14, but when the screw member approaches its retract position and cam 23 engages and actuates retract limit switch 21 the load limiting mechanism 27 then controls the motor 17 and de-energizes the motor when excessive torque is indicated because of the engagement of mechanical stops 28.

To prevent moisture and dust from reaching the cams and switches of positioning mechanism 20, a sealed enclosure 30 is provided. The enclosure 30 has a base plate 31 which mounts on the casing of motor 17 below the screw member 14 and a removable cover 32 which surrounds a portion of screw member 14, encloses the switches 21 and 22 and the cams 23 and 24, and terminates on the base plate.

In order to form a seal between base plate 31 and cover 32 which will permit periodic removal of the cover, I provide a channel 33 in the face of the base plate which receives the cover's lower edge 34 (see FIGURES 2 and 3). If desired, the seal may be made more effective by disposing a gasket in channel 33. Elongated screws 35 are provided which engage cover 32 and thread into tapped holes in base plate 31 to secure the cover thereon.

To establish a seal between the enclosure 30 and the axially movable screw member 14, a frame member 36 is provided which mounts on the outer end of base plate 31 and is secured thereto by a bottom flange 37 and screws 37a. The frame 36 is rectangular and has a peripheral channel 38 in all but its bottom edge which snugly receives the edge 39 around a cut out portion in the outer end of cover 32 (see FIGURES 2, 4 and 5). A seal is thus formed between the cover 32 and frame 36 and, if desired, a gasket may be disposed in channel 38 to make the seal more effective.

The frame member 36 also has an axial bore 40 which surrounds the screw member 14. To form a seal between frame member 36 and the tube 25 which covers screw member 14, a collar 41 is mounted on tube 25 and forms a snug axially sliding fit therewith. The collar 41 has an outwardly extending radial flange 42 which has a diameter slightly less than the diameter of the frame member bore 40 and the frame member 36 has an inwardly extending radial flange 43 which has a bore diameter slightly greater than the peripheral diameter of collar 41. Thus, collar 41 is positioned in the bore 40 of frame 36 with one face of collar flange 42 engaging the adjacent face of bore flange 43, so that the flanges are engaged axially but can slide with respect to each other in a radial direction.

A clamping plate 44 is provided which overlies on the outer surface of frame 36 and has a bore 45 approximately the same diameter as the periphery of collar 41. The clamping plate 44 is secured to the frame 36 by screws 46 and holds the collar flange 42 in axial engagement with the flange 43 in bore 40. Since the collar 41 and frame 36 are engaged only in an axial direction, they can move radially with respect to each other until the periphery of the flange on one of the members engages the other, provided the clamping force holding the flanges in engagement is not so great as to prevent it. By proper regulation of the depth of bore 40 and the tightening of screws 46, the flanges 42 and 43 can be engaged with the proper force to form an effective seal and still permit this limited radial movement. Radial movement between the collar 41 and frame 36 without breaking the seal is a necessary feature because the screw member may be somewhat warped or may bow out of line under load.

To establish a seal between the enclosure 30 and housing 11, a flanged collar 47 is provided which fits snugly into a bore 48 in the outwardly facing end of the housing and abuts the outermost bearing 13. The flange 49 on collar 47 is rectangular and extends radially outward in face-to-face engagement with the outer end 50 of the housing on all sides except the bottom which overlaps the base plate 31 and is secured thereto by screws 51. A channel 52 is formed in the peripheral edges of the extending sides of the flange 49 which snugly receives the edges 53 around a cut out portion in the inner end of cover 32. This forms a seal between the cover and flange 49, and, if desirable, a gasket may be disposed in channel 52 to make the seal more effective.

All of the terminal edges of cover 32 are therefore snugly contained in channels on parts which are in sealed relationship to the housing and screw member of the actuator. At its inner end, the cover is sealed to the housing 11, on its bottom it is sealed to the base plate 31, and at its outer end it is sealed to the tube 25 by means of a sliding fit which allows limited radial movement. When the screws 35 are withdrawn from the base plate 31, the cover 32 can be removed leaving base plate 31, frame 36 and collar 47 in place. Removability of cover 32 permits easy access to the cams 23 and 24 for adjustment.

As previously mentioned, the cams 23 and 24 determine the extend and retract positions of screw member 14 in the usual application by actuating switches 21 and 22, respectively. Since the cams 23 and 24 are threadedly adjustable on tube 25, their positions can be varied and the extend and retract positions thereby adjusted.

To lock the cams 23 and 24 in an adjusted position, a detent mechanism 55 is provided (see FIGURES 7 and 8). The detent mechanism 55 utilizes two bow springs 56, the ends 57 of which are turned normal to its center portion. The bow springs 56 fit in an elongated longitudinal cavity 58 in the bore of the cams 23 and 24, one in each cam, and are held against longitudinal movement by engagement of the ends 57 with radially directed recesses 59. The center portion of the bow springs project into the cam's bore and engage the threads 26 on the periphery of tube member 25. A plurality of angularly spaced V-shaped longitudinal grooves 60 are formed in the periphery of tube 25 into which the bow springs snap when aligned therewith.

Considerable torque must be applied to the cams 23 and 24 to rotate the bow springs 56 out of a particular groove 60 and the cams therefore will not change position, once they are adjusted, until the required torque is applied for further adjustment. The resiliency of the bow springs and angle of the V-shaped grooves determine the torque necessary to rotate the cams and this can be designed so that the torque required is great enough to prevent the cams from moving by vibration, but small enough to permit them to be adjusted by hand. As pointed out above, the cover 32 is easily removable to allow adjustment of cams 23 and 24.

I have therefore provided a mechanical actuator with adjustable cams which, together with the remainder of the positioning mechanism, is contained in a sealed enclosure that prevents the entrance of dust and moisture and yet permits easy access for manual adjustment.

While the form of my invention herein shown and described is fully capable of attaining the objects and providing the advantages set out, it should be understood that I do not mean to limit myself to the particular details disclosed, except as specified in the appended claims.

I claim:

1. Sealing apparatus for a longitudinally movable rod element in an enlarged opening of a housing having a base and a cover separable therefrom; said sealing apparatus comprising:

first plate to be located in the opening and secured to the housing, said first plate being detachably engaged with the cover of said housing, said first plate having a circular opening therein, said opening at one end having a reduced diameter portion, whereby to provide a radial shoulder intermediate the faces of said first plate;

said reduced diameter portion of the circular opening of said first plate comprising the portion of said first plate in closest proximity to said rod element, a second plate removably clamped to said first plate on the face thereof adjacent the larger diameter portion of the opening therein, said second plate having a central opening of substantially the diameter of the reduced diameter portion of the opening in said first plate, whereby to provide a circular channel with side walls formed of opposed surfaces of said shoulder and said second plate, and a collar having an opening to slideably receive the rod element, said collar having a cylindrical portion extending axially of and between said element and said reduced diameter portion of said first plate opening, said cylindrical portion having an outer diameter less than the diameter of the reduced diameter portion of the opening in said first plate, said collar having a radial flange located in said circular channel, said flange being smaller in diameter than the larger diameter portion of the opening in said first plate, the faces of said flange abutting the opposed surfaces of said radial shoulder and said second plate, whereby to prevent axial movement of said collar while permitting limited transverse movement thereof.

2. In an enclosure for a longitudinally movable rod-like element wherein a housing for said element, which housing includes a base and a cover separable therefrom, has an opening through which one end of said element extends, the arrangement comprising:

a frame member having an outer peripheral channel for detachable mating engagement with the cover of said housing, said frame member also having bore means including larger and lesser diameter portions, the diameters of both of said portions being greater than the diameter of said element, said lesser diameter portion of said frame bore means comprising the portion of said frame member in closest proximity to said element, means removably secured to the surface of said frame member adjacent said larger diameter portion for providing a circular channel with the lesser diameter portion of said frame member, said means having a bore of substantially the same diameter as and coaxial with said lesser diameter portion of said frame bore means, and sealing means engaging said circular channel and said element for permitting limited radial movement of said element within said circular channel and simultaneously restraining said lesser diameter portion of said frame member from contacting said element, said sealing means including a cylindrical portion extending axially of and between said element and said said lesser diameter portion and a flange portion radially projecting from the outermost end of said cylindrical portion into said circular channel.

References Cited in the file of this patent

UNITED STATES PATENTS

| 1,095,840 | Fritz | May 5, 1914 |
| 1,387,172 | Postel et al. | Aug. 9, 1921 |
| 2,015,233 | Pfleger | Sept. 24, 1935 |
| 2,327,777 | Falk | Aug. 24, 1943 |
| 2,422,495 | Morrow | June 17, 1947 |
| 2,469,269 | Lear | May 3, 1949 |
| 2,590,251 | Hoover | Mar. 25, 1952 |
| 2,641,346 | Risk et al. | June 9, 1953 |
| 2,660,028 | Geyer | Nov. 24, 1953 |
| 2,771,498 | Bredtschneider et al. | Nov. 20, 1956 |
| 2,782,656 | McCarthy et al. | Feb. 26, 1957 |
| 2,809,736 | Hoover | Oct. 15, 1957 |

FOREIGN PATENTS

| 105,581 | Switzerland | July 16, 1924 |
| 258,083 | Switzerland | Apr. 16, 1949 |
| 948,534 | France | Jan. 31, 1949 |